US012617382B2

(12) United States Patent
Allen et al.

(10) Patent No.: US 12,617,382 B2
(45) Date of Patent: May 5, 2026

(54) BRAKE ASSEMBLY AND METHOD OF SUPPLYING LUBRICANT IN A BRAKE ASSEMBLY

(71) Applicant: DEERE & COMPANY, Moline, IL (US)

(72) Inventors: Kevin M. Allen, Bartlesville, OK (US); Martin L. Meek, Jr., Coffeyville, KS (US); Shantanu S. Joshi, Pune (IN); Galen R. Love, Fort Scott, KS (US)

(73) Assignee: Deere & Company, Moline, IL (US)

( * ) Notice: Subject to any disclaimer, the term of this patent is extended or adjusted under 35 U.S.C. 154(b) by 542 days.

(21) Appl. No.: 18/351,808

(22) Filed: Jul. 13, 2023

(65) Prior Publication Data

US 2025/0018914 A1      Jan. 16, 2025

(51) Int. Cl.
*B60T 13/22* (2006.01)
*B60T 1/06* (2006.01)
*F16D 65/18* (2006.01)

(52) U.S. Cl.
CPC .............. *B60T 13/22* (2013.01); *B60T 1/062* (2013.01); *F16D 65/186* (2013.01)

(58) Field of Classification Search
CPC .......... B60T 1/062; B60T 13/22; F16D 55/36; F16D 55/40; F16D 65/02; F16D 65/186; F16H 57/0473
USPC ........................................................ 188/170
See application file for complete search history.

(56) References Cited

U.S. PATENT DOCUMENTS

| | | | | |
|---|---|---|---|---|
| 3,547,233 | A | * | 12/1970 | Girvan .................... F16D 65/72 |
| | | | | 188/170 |
| 4,566,572 | A | | 1/1986 | Flotow et al. |
| 4,667,784 | A | * | 5/1987 | Cronin .................... B60T 1/065 |
| | | | | 475/221 |
| 4,947,974 | A | | 8/1990 | Smemo et al. |
| 6,594,993 | B1 | * | 7/2003 | Friedrichsen .......... B60T 1/062 |
| | | | | 92/24 |

(Continued)

FOREIGN PATENT DOCUMENTS

| | | |
|---|---|---|
| DE | 2706806 A1 | 10/1977 |
| DE | 10030282 A1 | 1/2002 |

(Continued)

OTHER PUBLICATIONS

German Search Report issued in application No. 102024116592.8 dated Feb. 24, 2025, 08 pages.

*Primary Examiner* — Thomas J Williams
*Assistant Examiner* — San M Aung
(74) *Attorney, Agent, or Firm* — Tucker Ellis LLP

(57) ABSTRACT

A brake assembly includes a housing configured to contain lubricant at a lubricant level, a shaft disposed in the housing, an annular brake pack disposed in the housing and around the shaft, an annular piston disposed in the housing and around the shaft and configured to move axially relative to the annular brake pack, a spring disposed in the housing and around the shaft, abutting the piston, configured to act against the piston, and including a lower portion of the spring configured to be disposed below the lubricant level and an upper portion of the spring configured to be disposed above the lubricant level, and an annular lubricant absorber disposed at the spring and configured to supply lubricant to the upper portion of the spring.

19 Claims, 4 Drawing Sheets

(56)                        References Cited

U.S. PATENT DOCUMENTS

| | | | | |
|---|---|---|---|---|
| 6,743,002 | B1 * | 6/2004 | Millar | F04C 15/0057 |
| | | | | 418/61.3 |
| 8,028,788 | B2 | 10/2011 | Stilwell et al. | |
| 11,458,935 | B1 | 10/2022 | Joshi et al. | |
| 2010/0263969 | A1 * | 10/2010 | Bayer | B60K 17/046 |
| | | | | 188/72.3 |
| 2011/0186390 | A1 * | 8/2011 | Brenninger | F16D 65/853 |
| | | | | 188/71.5 |
| 2018/0058513 | A1 * | 3/2018 | Long | F16D 65/186 |
| 2023/0147694 | A1 * | 5/2023 | Grillon | F16D 59/02 |
| | | | | 188/170 |

FOREIGN PATENT DOCUMENTS

| | | |
|---|---|---|
| DE | 112019000224 T5 | 8/2020 |
| DE | 102022207344 A1 | 3/2023 |

* cited by examiner

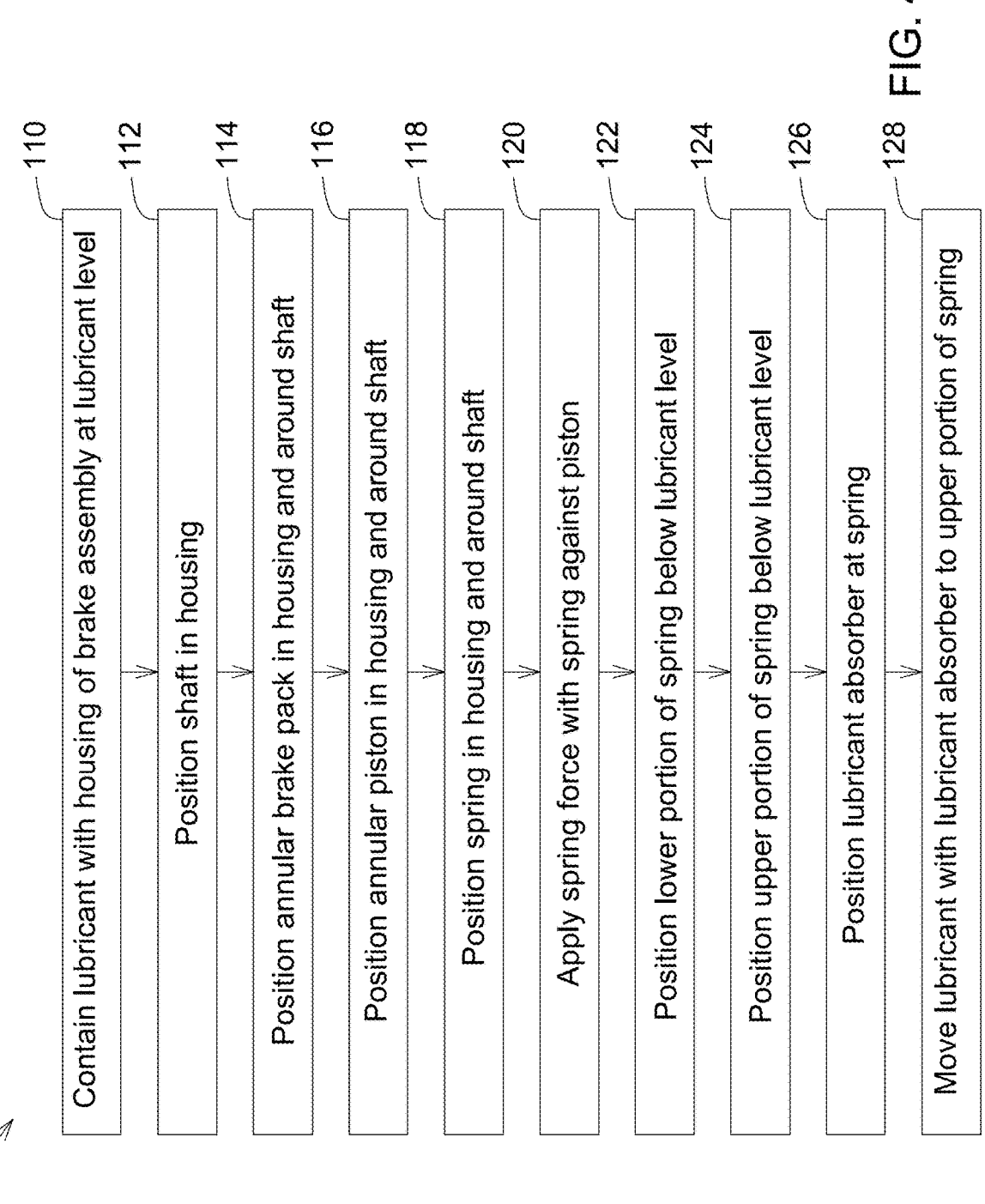

110 — Contain lubricant with housing of brake assembly at lubricant level

112 — Position shaft in housing

114 — Position annular brake pack in housing and around shaft

116 — Position annular piston in housing and around shaft

118 — Position spring in housing and around shaft

120 — Apply spring force with spring against piston

122 — Position lower portion of spring below lubricant level

124 — Position upper portion of spring below lubricant level

126 — Position lubricant absorber at spring

128 — Move lubricant with lubricant absorber to upper portion of spring

BRAKE ASSEMBLY AND METHOD OF SUPPLYING LUBRICANT IN A BRAKE ASSEMBLY

BACKGROUND

Vehicles, including work vehicles, may utilize a brake that may be engaged with a drivetrain component of the vehicle to prevent or inhibit movement of the vehicle. The brake may include a piston that is controllably moved with a spring and hydraulic mechanism to selectively apply pressure to an assembly of alternating friction discs and separator plates to generate a braking force for the vehicle.

SUMMARY

According to an aspect of the present disclosure, a brake assembly for a work vehicle includes a housing configured to contain lubricant at a lubricant level, a shaft disposed in the housing, an annular brake pack disposed in the housing and around the shaft, an annular piston disposed in the housing and around the shaft and configured to move axially relative to the annular brake pack, a spring disposed in the housing and around the shaft, abutting the piston, configured to act against the piston, and comprising a lower portion of the spring configured to be disposed below the lubricant level and an upper portion of the spring configured to be disposed above the lubricant level, and an annular lubricant absorber disposed at the spring and configured to supply lubricant to the upper portion of the spring.

The spring may include at least one conical spring washer. The spring may include two conical spring washers axially stacked to act together against the piston. The lubricant absorber may be disposed between the two conical spring washers and configured to supply lubricant to the upper portion of the two conical spring washers of the spring. The assembly may include a spacer positioned between the two conical spring washers to separate the two conical spring washers. The spacer may include an annular wire disposed at an inner edge of each of the two conical spring washers of the spring. The lubricant absorber may be deformed by the spring upon the spring acting against the piston to supply lubricant to the upper portion of the spring. The assembly may further include a first bearing and a second bearing supporting the shaft and being disposed in the housing such that the annular brake pack is positioned between the first bearing and the second bearing. The spring may be preloaded with a spring force that acts against the piston. The assembly may further include a hydraulic brake release operable to selectively counteract the spring force of the spring by applying hydraulic pressure to the piston.

According to an aspect of the present disclosure, a method of supplying lubricant in a brake assembly includes containing lubricant with a housing of the brake assembly at a lubricant level, positioning a shaft in the housing, positioning an annular brake pack in the housing and around the shaft, positioning an annular piston in the housing and around the shaft, positioning a spring in the housing and around the shaft, applying a spring force with the spring against the piston, positioning a lower portion of the spring below the lubricant level, positioning an upper portion of the spring above the lubricant level, positioning a lubricant absorber at the spring, and moving lubricant with the lubricant absorber to the upper portion of the spring.

The method may include moving the piston axially against the spring, compressing the spring upon movement of the piston axially against the spring, and moving lubricant with the lubricant absorber from the lower portion of the spring to the upper portion of the spring upon compression of the spring and movement of the piston axially against the spring. The method may further include positioning the spring in the housing and around the shaft comprises stacking two conical spring washers axially to act together against the piston in the housing and around the shaft. Positioning the lubricant absorber at the spring may further include positioning the lubricant absorber between the two conical spring washers. The method may further include separating the two conical spring washers with a spacer. The method may further include deforming the lubricant absorber with the two conical spring washers upon compression of the spring and movement of the piston axially against the spring. The method may further include supporting the shaft with a first bearing and a second bearing, and positioning the first bearing and the second bearing in the housing such that the annular brake pack is positioned between the first bearing and the second bearing. The method may further include preloading the spring with the spring force that acts against the piston. The method may further include selectively counteracting the spring force of the spring with a hydraulic brake release by applying hydraulic pressure to the piston.

Other features and aspects will become apparent by consideration of the detailed description, claims, and accompanying drawings.

BRIEF DESCRIPTION OF THE DRAWINGS

The detailed description of the drawings refers to the accompanying figures.

FIG. 4 illustrates a method of supplying lubricant in a brake assembly in accordance with an embodiment of the present disclosure.

Like reference numerals are used to indicate like elements throughout the several figures.

DETAILED DESCRIPTION

Figure 1:
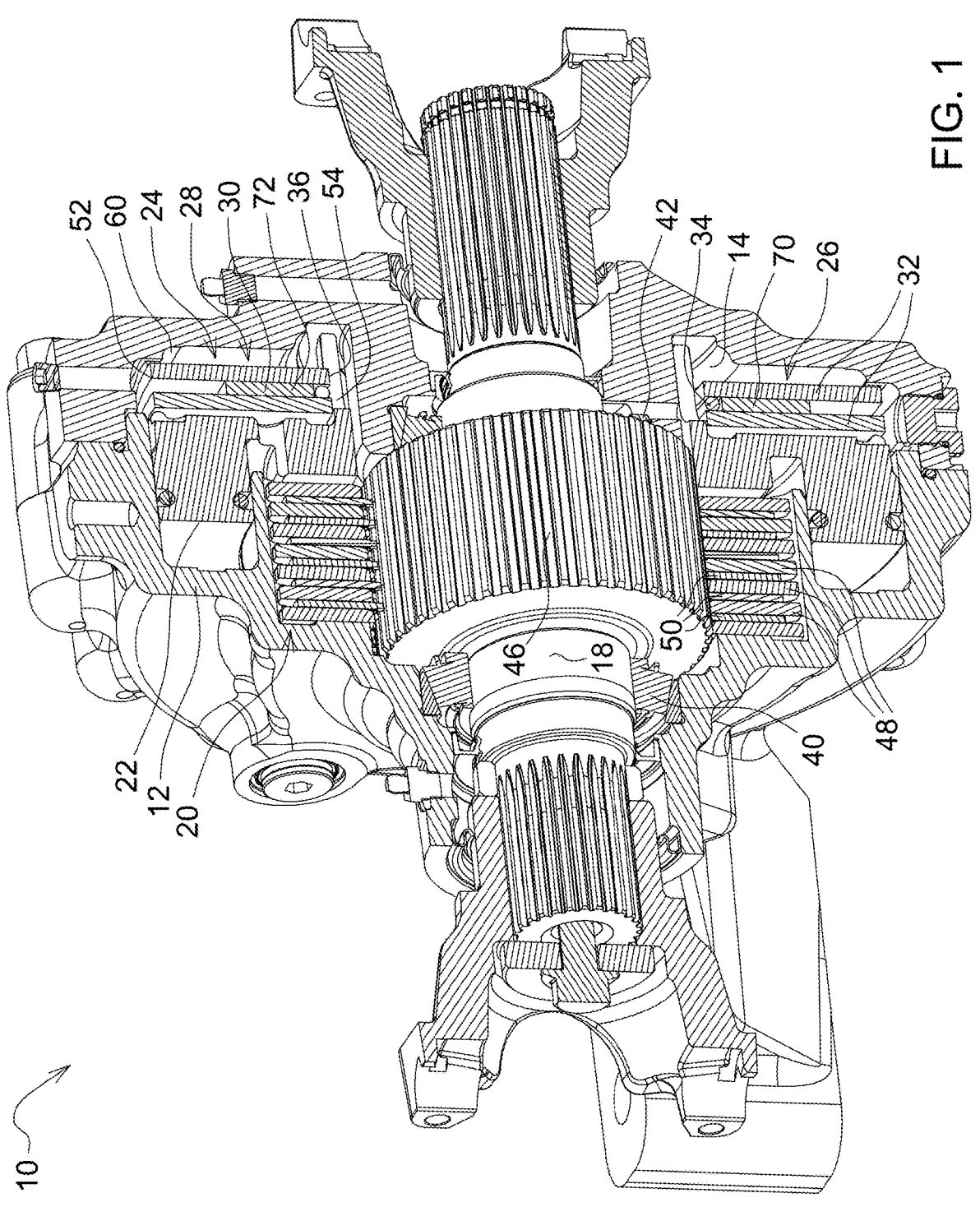
FIG. 1 is a perspective partial cross-sectional view of a brake assembly in accordance with an embodiment of the present disclosure.
Figure 2:
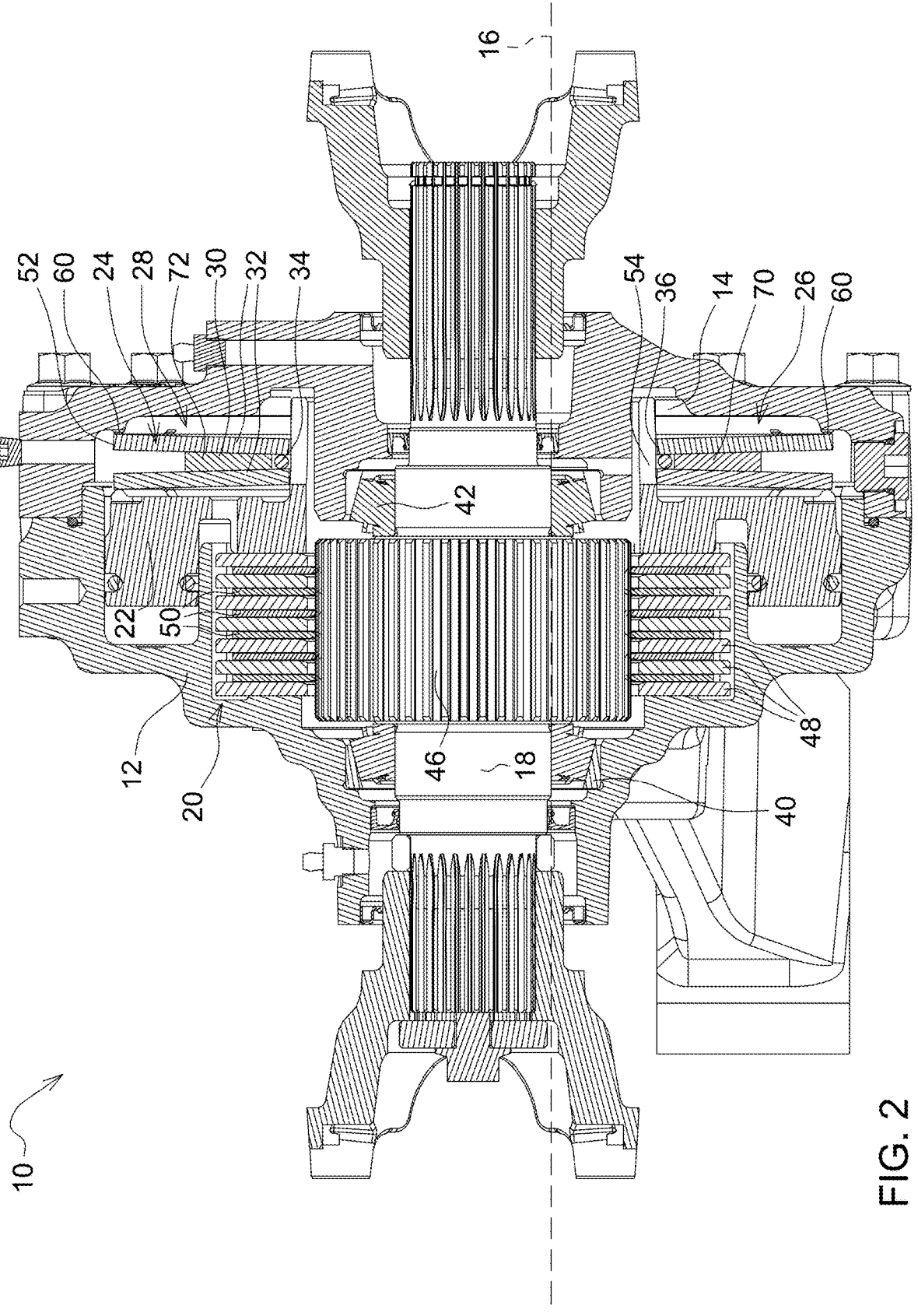
FIG. 2 is a partial cross-sectional view of a brake assembly in a first state in accordance with an embodiment of the present disclosure.
Figure 3:
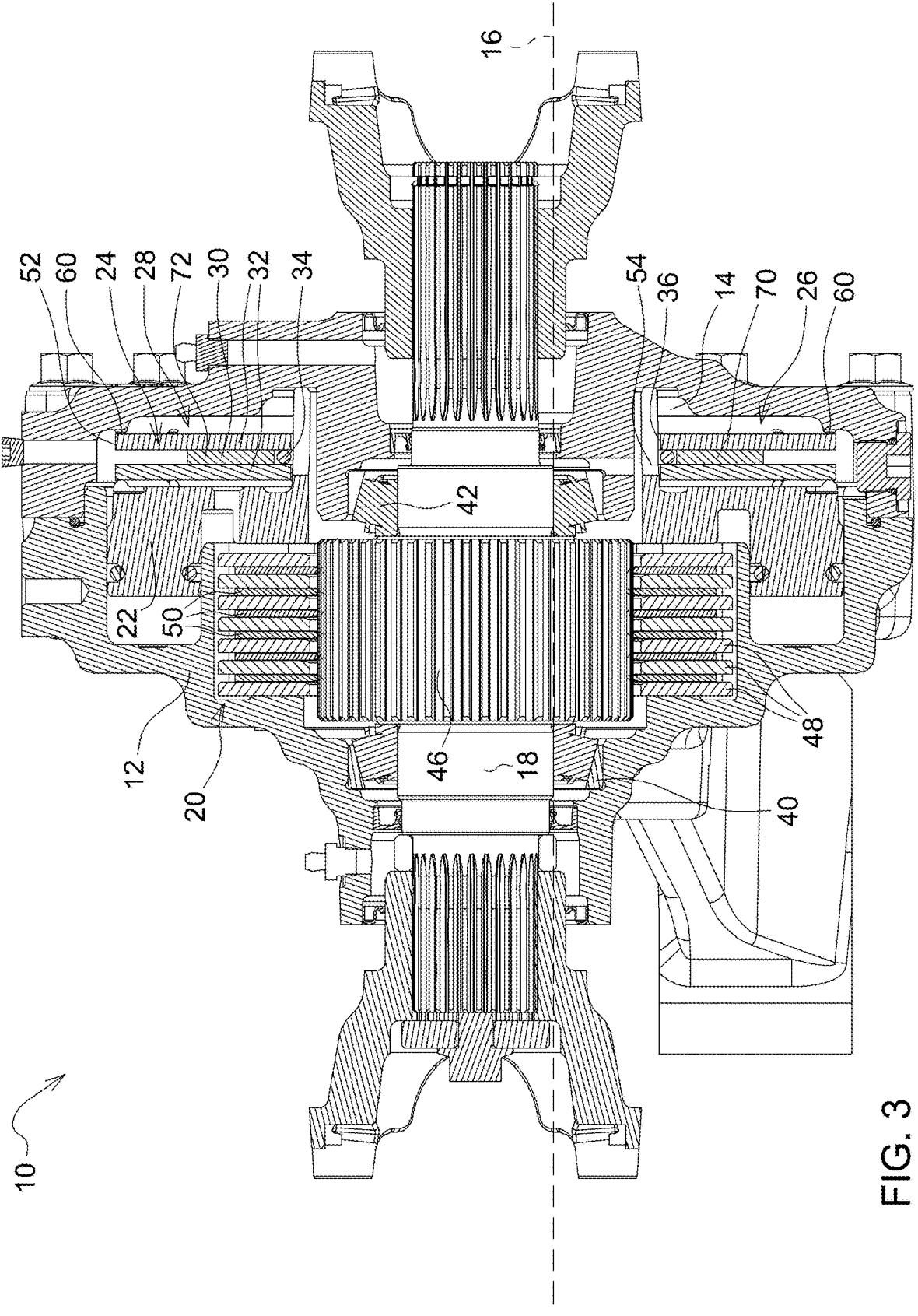
FIG. 3 is a partial cross-sectional view of a brake assembly in a second state in accordance with an embodiment of the present disclosure.

Referring to FIGS. 1-3, a brake assembly 10 is illustrated in accordance with an embodiment of the present disclosure. The assembly 10 may be utilized for or in a work vehicle (not shown) or another vehicle or machine. It will be appreciated that a work vehicle may include an internal combustion engine, electric, hydraulic, pneumatic, or other motor or machine, hydraulic system, and a drive shaft or other mechanical input device coupled to the assembly 10 in accordance with embodiments of the present disclosure. The assembly 10 of one or more embodiments may be utilized as a brake, such as a park brake, a clutch, or another component of a work vehicle or other machinery.

The assembly 10 includes a housing 12 that is arranged in the illustrated embodiment such that a shaft 18 of the assembly 10 is oriented horizontally and disposed in the housing 12. As best shown in FIGS. 2 and 3, the housing 12 at least partially contains lubricant 14 such that the lubricant 14 fills the housing 12 to a lubricant level 16.

Although not illustrated, a lubrication system is disclosed for certain embodiments that includes various fluid flow passages that extend from a primary sump (or another area(s) containing lubrication fluid) toward various moving components. In some embodiments, passages may extend from the primary sump and may vary in number and configuration, as well as function. Certain passages may primarily provide flow paths for pressurized lubrication from the primary sump (or other areas) to various moving components (e.g., bearings and moving components of the assembly 10), while other passages may primarily provide escape paths for trapped air and other passages may primarily provide lubrication drainage.

The assembly 10 is operable to impart a brake force that arrests rotation of the shaft 18, thereby providing, in an embodiment, a braking force to a work vehicle and preventing or inhibiting movement of a work vehicle.

As shown in FIGS. 1-3, the assembly 10 includes a hub 46 coupled to the shaft 18, an annular brake pack 20. The annular brake pack 20 is disposed around the shaft 18 in the housing 12 and includes separator plates 48 and friction discs 50 disposed around the hub 46.

The assembly 10 includes an annular piston 22 disposed in the housing 12 and around the shaft 18. The piston 22 is configured to move axially relative to the annular brake pack 20.

The assembly 10 includes a first bearing 40 and a second bearing 42 supporting the shaft 18 and being disposed in the housing 12. The annular brake pack 20 is positioned between the first bearing 40 and the second bearing 42.

The assembly 10 includes a spring 24 disposed in the housing 12 and around the shaft 18. The spring 24 abuts the piston 22 and is configured to act on or against the piston 22. The spring 24 includes a lower portion 26 configured to be disposed below the lubricant level 16 and an upper portion 28 configured to be disposed above the lubricant level 16.

In the illustrated embodiment, the assembly 10 is configured as a spring-applied and hydraulically-released brake assembly where the spring 24 is preloaded with a spring force that acts on or against the piston 22, and where the assembly 10 includes a hydraulic brake release, indicated generally in FIG. 1, that is operable to selectively counteract the spring force of the spring 24, such as by automated control or remote or local operator control. It will be appreciated that, in additional embodiments not shown, the assembly 10 includes configurations and functions to operate as a hydraulically-applied and spring-released brake assembly.

The hub 46 is mounted to the shaft 18, such as through a splined connection, or formed integrally therewith to rotate with the shaft 18. In the brake pack 20, the friction discs 50 may rotate with the hub 46, while the separator plates 48 are grounded to the housing 12 (or to another feature that is fixed relative to the rotation of the shaft 18). The piston 22 is configured to move relative to, and act on or against, the brake pack 20 during operation of the assembly 10. The piston 22 may contact a separator plate 48 or braking surface of the brake pack 20 and cause the separator plates 48 to contact and engage the friction discs 50, thereby generating or imparting a braking force to arrest rotation of the shaft 18.

The spring 24 includes one or more conical spring washers 32 in embodiments. In the illustrated embodiment, the spring 24 includes two conical spring washers 32 axially stacked to act together against the piston 22. The conical spring washer(s) 32 include(s) one or more coned-disc spring, disc spring, or Belleville washer(s). It will be appreciated that, although two washers 32 are included in the spring 24, more than two or one washer 32 may be provided in additional embodiments of the spring 24 and/or the assembly 10. Further, the spring 24 of additional embodiments not illustrated may include other types and configurations of spring components to form the spring 24, including without limitation coil or leaf springs and/or other types of resilient members.

In an embodiment, the spring 24 is preloaded with a spring force that acts against the piston 22. A hydraulic brake release is operable to selectively counteract the spring force of the spring 24 by applying hydraulic pressure to the piston 22.

The assembly 10 includes a spacer 34 positioned between the two conical spring washers 32 to separate the two conical spring washers 32. The spacer 34 is or includes an annular wire disposed at an inner edge 36 of each of the two conical spring washers 32 of the spring 24.

In the illustrated embodiment, the two conical spring washers 32 are oriented in opposite directions. The conical spring washers 32 have a non-linear spring rate such that, by stacking the conical spring washers 32, the spring 24 provides a more variable rate of spring force without completely compressing the conical spring washers 32, and such that as the conical spring washers 32 approach a flat condition (or go past flat such that a distance between the outer edges 52 of the conical spring washers 32 is less than a distance between the inner edges 36), the spring force thereof does not change substantially.

As shown in FIGS. 2 and 3, the spring 24 is positioned and configured such that the shaft 18 and an annular flange 54 of the piston 22 pass through the center opening of the conical spring washers 32. The inner diameter of the conical spring washers 32 and an outer diameter of the annular flange 54 are each sized to enable the piston 22 and annular flange 54 to move relative to the spring 24 while still functioning to maintain the conical spring washers 32 in stacked alignment. The spacer 34 may be configured as an annular wire that is positioned around the outer circumference of annular flange 54. The spacer 34 provides a support surface for the inner edge 36 of the conical spring washers 32 and increases the longevity of the washers 32.

Responsive to the spring 24 acting on the piston 22, the piston 22 is caused to move relative to the brake pack 20. The housing 12 provides for linear movement of the piston 22 therein and also operates to limit a stroke of the piston 22 with one or more contact surfaces or mechanical stops 44 included in the housing 12. As the piston 22 moves away from the brake pack 20 from an engaged position to a released position (upon operation of the hydraulic brake release, for example), the mechanical stop 44 functions to limit the stroke of the piston 22, which beneficially prevents the washers 32 from moving too close together and/or contacting each other at the outer edge 52 and also reduces windage in the assembly 10.

In the illustrated embodiment, the housing 12 also includes protrusions 60 that interact with the washers 32. The protrusions 60 are formed on the housing 12 adjacent the outer edge 52 of the washers 32 to provide a support surface for the washers 32. The protrusions 60 further provide a rolling contact point for the washers 32 and prevent the washers 32 from digging into the housing 12, thereby increasing the longevity of the washers 32.

The assembly 10 includes an annular lubricant absorber 30 disposed at the spring 24. The lubricant absorber 30 of certain embodiments supplies lubricant 14 to the upper portion 28 through wicking of the lubricant 14 from the lower portion 26. The annular lubricant absorber 30 includes a lower absorber portion 70 configured to be disposed below the lubricant level 16 and an upper absorber portion 72 configured to be disposed above the lubricant level 16. In particular embodiments, the lubricant 14 moves from the lower absorber portion 70 to the upper absorber portion 72. In particular embodiments, the lubricant absorber 30 is configured to absorb, hold, and/or allow movement or containment of lubricant 14 and/or facilitate wicking of the lubricant 14 upward from at or below the lubricant level 16. The lubricant absorber 30 contacts and/or abuts the spring 24 in embodiments. Accordingly, the lubricant absorber 30 is configured to supply lubricant 14 to the upper portion 28 of the spring 24. The lubricant absorber 30 is porous and/or deformable in embodiments. The lubricant absorber 30 is disposed between the two conical spring washers 32 and is configured to supply the lubricant 14 to the upper portion 28 of the two conical spring washers 32.

In some embodiments, the lubricant absorber 30 supplies lubricant 14 to the upper portion 28 upon the spring 24 acting against the piston 22. The lubricant absorber 30 of at least one embodiment is deformed by the spring 24 upon the spring 24 acting against the piston 22 to supply lubricant 14 to the upper portion 28 of the spring 24. Compression of the spring 24, such as by movement of the two conical spring washers 32 toward each other, acts to compress, reduce the size of, or otherwise deform the lubricant absorber 30. The compression or deformation of the lubricant absorber 30 causes lubricant 14 to flow out of the lubricant absorber 30, including to the upper portion 28 of the spring 24. Upon decompression of the spring 24, such as by movement of the piston 22 axially away from the spring 24, the lubricant absorber 30 expands or increases in volume to absorb additional lubricant 14.

Referring now to FIG. 4, a method 100 of supplying lubricant 14 in the brake assembly 10 is provided. The method 100 includes containing lubricant 14, at step 110, with the housing 12 of the assembly 10 at the lubricant level 16. The method 100 further includes positioning, at step 112, the shaft 24 in the housing 12 and positioning, at step 114, the annular brake pack 20 in the housing 12 and around the shaft 24. The method 100 further includes positioning, at step 116, the annular piston 22 in the housing 12 and around the shaft 24 and positioning, at step 118, positioning the spring 24 in the housing 12 and around the shaft 24. The method 100 further includes applying, at step 120, the spring force with the spring 24 against the piston 22, positioning, at step 122, the lower portion 26 of the spring 24 below the lubricant level 16, positioning, at step 124, the upper portion 28 of the spring 24 above the lubricant level 16, and positioning, at step 126, the lubricant absorber 30 at the spring 24. The method 100 further includes moving, at step 128, lubricant 14 with the lubricant absorber 30 to the upper portion 28 of the spring 24.

The method 100 of additional embodiments includes moving the piston 22 axially against the spring 24, compressing the spring 24 upon movement of the piston 22 axially against the spring 24, and moving lubricant 14 from the lower portion 26 of the spring 24 to the upper portion 28 of the spring 24 upon compression of the spring 24 and movement of the piston 22 axially against the spring 24.

The method 100 of additional embodiments includes stacking the two conical spring washers 32 axially to act together against the piston 22 in the housing 12 and around the shaft 24. The method 100 of additional embodiments includes positioning the lubricant absorber 30 between the two conical spring washers 32. The method 100 of additional embodiments includes separating the two conical spring washers 32 with the spacer 34. The method 100 of additional embodiments includes deforming the lubricant absorber 30 with the two conical spring washers 32 upon compression of the spring 24 and movement of the piston 22 axially against the spring 24. The method 100 of additional embodiments includes supporting the shaft 24 with the first bearing 40 and the second bearing 42 and positioning the first bearing 40 and the second bearing 42 in the housing 12 such that the annular brake pack 20 is positioned between the first bearing 40 and the second bearing 42. The method 100 of additional embodiments includes preloading the spring 24 with the spring force that acts against the piston 22. The method 100 of additional embodiments includes selectively counteracting the spring force of the spring 24 with the hydraulic brake release by applying hydraulic pressure to the piston 22.

Without in any way limiting the scope, interpretation, or application of the claims appearing below, a technical effect of one or more of the example embodiments disclosed herein is providing the lubricant absorber 30, the assembly 10, and the method to supply the lubricant 14 to the spring 24, thereby reducing heat caused by friction, preventing fretting and other wear, and increasing the longevity of the spring 24 and/or other components of the assembly 10 without the need for large, expensive, or complex pumps, lubricant passages, or other conventional mechanisms. Further, a technical effect of one or more of the example embodiments disclosed herein is providing the lubricant absorber 30, the assembly 10, and the method 100 to supply the lubricant 14 to the upper portion 28 of the spring 24, thereby reducing heat caused by friction, preventing fretting and other wear, and increasing the longevity of the spring 24 and/or other components of the assembly 10 without the need for large, expensive, or complex pumps, lubricant passages, or other conventional mechanisms. Another technical effect of one or more of the example embodiments disclosed herein is to provide the lubricant absorber 30, the assembly 10, and the method 100 to allow the lubricant 14 to move through the lubricant absorber 30 such that the lubricant 14 is provided to locations above the lubricant level 16, thereby reducing heat caused by friction, preventing fretting and other wear, and increasing the longevity of the spring 24 and/or other components of the assembly 10 without the need for large, expensive, or complex pumps, lubricant passages, or other conventional mechanisms. Another technical effect of one or more of the example embodiments disclosed herein is to utilize the compression of the spring 24 or relative movement of the conical spring washer(s) 32 to move or pump the lubricant 14 through the lubricant absorber 30 to move or supply the lubricant 14 to the upper portion 28 of the spring 24, thereby reducing heat caused by friction, preventing fretting and other wear, and increasing the longevity of the spring 24 and/or other components of the assembly 10 without the need for large, expensive, or complex pumps, lubricant passages, or other conventional mechanisms. Any and all elements, features, components, functions, or details of any embodiment of the assembly 10 may be included to form one or more embodiments of the method 100 in accordance with the present disclosure. Further, any and all steps, features, components, functions, or details of any embodiment of the method 100 may be included to form one or more embodiments of the assembly 10 in accordance with the present disclosure.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A brake assembly for a work vehicle, the assembly comprising:
    a housing configured to contain lubricant at a lubricant level;
    a shaft disposed in the housing;
    an annular brake pack disposed in the housing and around the shaft;
    an annular piston disposed in the housing and around the shaft and configured to move axially relative to the annular brake pack;
    a spring disposed in the housing and around the shaft, abutting the piston, configured to act against the piston, and comprising a lower portion of the spring configured to be disposed below the lubricant level and an upper portion of the spring configured to be disposed above the lubricant level; and
    an annular lubricant absorber disposed at the spring and configured to supply lubricant to the upper portion of the spring.

2. The assembly of claim 1, wherein the spring comprises at least one conical spring washer.

3. The assembly of claim 2, wherein the spring comprises two conical spring washers axially stacked to act together against the piston.

4. The assembly of claim 3, wherein the lubricant absorber is disposed between the two conical spring washers and configured to supply lubricant to the upper portion of the two conical spring washers of the spring.

5. The assembly of claim 4, further comprising a spacer positioned between the two conical spring washers to separate the two conical spring washers.

6. The assembly of claim 5, wherein the spacer comprises an annular wire disposed at an inner edge of each of the two conical spring washers of the spring.

7. The assembly of claim 1, wherein the lubricant absorber is deformed by the spring upon the spring acting against the piston to supply lubricant to the upper portion of the spring.

8. The assembly of claim 1, wherein the assembly comprises a first bearing and a second bearing supporting the shaft and being disposed in the housing such that the annular brake pack is positioned between the first bearing and the second bearing.

9. The assembly of claim 1, wherein the spring is preloaded with a spring force that acts against the piston.

10. The assembly of claim 9, further comprising a hydraulic brake release operable to selectively counteract the spring force of the spring by applying hydraulic pressure to the piston.

11. A method of supplying lubricant in a brake assembly, the method comprising:
    containing lubricant with a housing of the brake assembly at a lubricant level;
    positioning a shaft in the housing;
    positioning an annular brake pack in the housing and around the shaft;
    positioning an annular piston in the housing and around the shaft;
    positioning a spring in the housing and around the shaft;
    applying a spring force with the spring against the piston;
    positioning a lower portion of the spring below the lubricant level;
    positioning an upper portion of the spring above the lubricant level;
    positioning a lubricant absorber at the spring; and
    moving lubricant with the lubricant absorber to the upper portion of the spring.

12. The method of claim 11, further comprising:
    moving the piston axially against the spring;
    compressing the spring upon movement of the piston axially against the spring; and
    moving lubricant with the lubricant absorber from the lower portion of the spring to the upper portion of the spring upon compression of the spring and movement of the piston axially against the spring.

13. The method of claim 12, wherein positioning the spring in the housing and around the shaft comprises stacking two conical spring washers axially to act together against the piston in the housing and around the shaft.

14. The method of claim 13, wherein positioning the lubricant absorber at the spring comprises positioning the lubricant absorber between the two conical spring washers.

15. The method of claim 14, further comprising separating the two conical spring washers with a spacer.

16. The method of claim 14, further comprising deforming the lubricant absorber with the two conical spring washers upon compression of the spring and movement of the piston axially against the spring.

17. The method of claim 11, further comprising:
    supporting the shaft with a first bearing and a second bearing; and
    positioning the first bearing and the second bearing in the housing such that the annular brake pack is positioned between the first bearing and the second bearing.

18. The method of claim 11, further comprising preloading the spring with the spring force that acts against the piston.

19. The method of claim 18, further comprising selectively counteracting the spring force of the spring with a hydraulic brake release by applying hydraulic pressure to the piston.

* * * * *